US008657656B2

(12) United States Patent
Miller

(10) Patent No.: US 8,657,656 B2
(45) Date of Patent: Feb. 25, 2014

(54) DETERMINATION OF RESTORATION EVENT

(75) Inventor: Mark A. Miller, New York, NY (US)

(73) Assignee: CFPH, LLC, New York, NY (US)

(*) Notice: Subject to any disclaimer, the term of this patent is extended or adjusted under 35 U.S.C. 154(b) by 537 days.

(21) Appl. No.: 12/259,325

(22) Filed: Oct. 28, 2008

(65) Prior Publication Data

US 2010/0105465 A1 Apr. 29, 2010

(51) Int. Cl.
*G06F 17/00* (2006.01)

(52) U.S. Cl.
USPC .......... 463/11

(58) Field of Classification Search
USPC .......... 463/11-13, 16-25
See application file for complete search history.

(56) References Cited

U.S. PATENT DOCUMENTS

| | | | |
|---|---|---|---|
| 4,266,770 | A | 5/1981 | Yeager |
| 4,531,187 | A | 7/1985 | Uhland |
| 4,926,327 | A | 5/1990 | Sidley |
| 5,255,915 | A | 10/1993 | Miller |
| 5,356,145 | A | 10/1994 | Verschoor |
| 5,586,766 | A | 12/1996 | Forte et al. |
| 5,605,334 | A | 2/1997 | McCrea, Jr. |
| 5,630,753 | A | 5/1997 | Fuchs |
| 5,682,550 | A | 10/1997 | Brown et al. |
| 5,707,287 | A | 1/1998 | McCrea, Jr. |
| 5,803,808 | A | 9/1998 | Strisower |
| 5,836,586 | A | 11/1998 | Marks et al. |
| 5,851,147 | A | 12/1998 | Stupak et al. |
| 5,941,769 | A | 8/1999 | Order |
| 5,967,894 | A | 10/1999 | Kinoshita et al. |
| 6,126,541 | A | 10/2000 | Fuchs |
| 6,139,014 | A | 10/2000 | Breeding et al. |
| 6,217,447 | B1 | 4/2001 | Lofink et al. |
| 6,299,536 | B1 | 10/2001 | Hill |
| 6,386,973 | B1 | 5/2002 | Yoseloff |
| 6,585,591 | B1 | 7/2003 | Baerlocher et al. |
| 6,612,926 | B1 | 9/2003 | Dabrowski |
| 6,663,487 | B1 * | 12/2003 | Ladner .......... 463/13 |
| 6,811,486 | B1 | 11/2004 | Luciano, Jr. |
| 6,811,488 | B2 | 11/2004 | Paravia et al. |
| 6,869,074 | B2 | 3/2005 | Miller |

(Continued)

FOREIGN PATENT DOCUMENTS

| | | |
|---|---|---|
| JP | 58-081059 | 5/1983 |
| JP | 10-507103 | 7/1998 |
| WO | WO/96/04970 | 2/1996 |

OTHER PUBLICATIONS

"Baccarat-Learn to play like a professional with a unique free evaluation—Save Money", 4 pages; Accessed Oct. 13, 2008; http://web.archive.org/web/20010603045041/www.happyfortune.com/features.htm.

(Continued)

*Primary Examiner* — Ronald Laneau
(74) *Attorney, Agent, or Firm* — Mark Miller

(57) ABSTRACT

Example methods and devices are set forth for playing a game. In some embodiments, an inventory of game indicia is arranged in a random but established, serial order. In some embodiments, for each hand of play the player makes a wager and game indicia are displayed in order from the inventory to define a winning or losing outcome. In some embodiments, a display, as hands are played, displays the remaining constituency of the inventory and the player, before any game, can order re-shuffling and re-constitute of the inventory. Other embodiments are described.

18 Claims, 7 Drawing Sheets

(56) References Cited

U.S. PATENT DOCUMENTS

| | | | |
|---|---|---|---|
| 7,056,205 | B2 | 6/2006 | Odom |
| 7,086,943 | B2 | 8/2006 | Mugnolo et al. |
| 7,114,718 | B2 | 10/2006 | Grauzer et al. |
| 7,182,690 | B2 | 2/2007 | Giobbi et al. |
| 7,341,519 | B2 | 3/2008 | McMain et al. |
| 7,419,162 | B2 | 9/2008 | Lancaster et al. |
| 7,425,178 | B1 * | 9/2008 | Odom ............................ 463/21 |
| 7,431,648 | B2 * | 10/2008 | Odom et al. .................... 463/21 |
| 7,523,941 | B2 | 4/2009 | Thomas et al. |
| 7,530,572 | B2 | 5/2009 | Thomas et al. |
| 7,611,409 | B2 | 11/2009 | Muir et al. |
| 7,637,506 | B2 | 12/2009 | Naicker |
| 7,717,429 | B2 | 5/2010 | Lutnick et al. |
| 7,811,167 | B2 | 10/2010 | Giobbi et al. |
| 7,914,369 | B2 | 3/2011 | Walker et al. |
| 7,942,418 | B2 | 5/2011 | Amaitis et al. |
| 8,001,079 | B2 | 8/2011 | Lu et al. |
| 8,079,595 | B2 | 12/2011 | Amaitis et al. |
| 8,113,941 | B2 | 2/2012 | Gomez et al. |
| 8,137,173 | B2 | 3/2012 | Miller |
| 8,147,307 | B2 | 4/2012 | Miller |
| 8,147,308 | B2 | 4/2012 | Miller |
| 8,192,266 | B2 | 6/2012 | Alderucci et al. |
| 8,226,460 | B2 | 7/2012 | Miller |
| 8,287,346 | B2 | 10/2012 | Miller |
| 8,308,543 | B2 | 11/2012 | Miller |
| 8,408,988 | B2 | 4/2013 | Miller |
| 8,523,183 | B2 | 9/2013 | Amaitis et al. |
| 8,523,684 | B2 | 9/2013 | Lutnick et al. |
| 2001/0035608 | A1 | 11/2001 | Hoyt et al. |
| 2002/0068635 | A1 | 6/2002 | Hill |
| 2002/0098888 | A1 | 7/2002 | Rowe et al. |
| 2002/0103017 | A1 | 8/2002 | Odom et al. |
| 2002/0155872 | A1 | 10/2002 | Odom et al. |
| 2002/0195773 | A1 | 12/2002 | Dunn |
| 2003/0064805 | A1 | 4/2003 | Wells |
| 2003/0109310 | A1 | 6/2003 | Heaton et al. |
| 2004/0072607 | A1 | 4/2004 | Thomas et al. |
| 2004/0082373 | A1 | 4/2004 | Cole et al. |
| 2004/0142742 | A1 | 7/2004 | Schneider et al. |
| 2005/0037834 | A1 | 2/2005 | Stern et al. |
| 2005/0059452 | A1 | 3/2005 | Hartl |
| 2005/0101383 | A1 | 5/2005 | Wells |
| 2005/0130728 | A1 | 6/2005 | Nguyen et al. |
| 2005/0143158 | A1 * | 6/2005 | Odom et al. .................... 463/13 |
| 2005/0161882 | A1 | 7/2005 | Miller |
| 2005/0181851 | A1 | 8/2005 | Amaitis et al. |
| 2005/0187020 | A1 | 8/2005 | Amaitis et al. |
| 2006/0079308 | A1 | 4/2006 | Asher et al. |
| 2006/0121978 | A1 | 6/2006 | Hornik et al. |
| 2006/0151954 | A1 | 7/2006 | Silverman |
| 2006/0183540 | A1 | 8/2006 | Grauzer et al. |
| 2006/0189382 | A1 | 8/2006 | Muir et al. |
| 2007/0001398 | A1 | 1/2007 | Walker et al. |
| 2007/0054721 | A1 | 3/2007 | Jackson |
| 2007/0111772 | A1 | 5/2007 | Shuster et al. |
| 2007/0243935 | A1 | 10/2007 | Huizinga |
| 2007/0254732 | A1 | 11/2007 | Walker et al. |
| 2007/0270224 | A1 | 11/2007 | Abbott |
| 2008/0054568 | A1 | 3/2008 | Lutnick et al. |
| 2008/0067743 | A1 | 3/2008 | Naicker |
| 2008/0090650 | A1 | 4/2008 | Tarantino |
| 2008/0119257 | A1 | 5/2008 | Stern et al. |
| 2008/0182644 | A1 | 7/2008 | Lutnick et al. |
| 2009/0325706 | A1 | 12/2009 | Geist, Jr. et al. |
| 2010/0009737 | A1 | 1/2010 | Amaitis et al. |
| 2010/0099477 | A1 * | 4/2010 | Alderucci et al. .............. 463/11 |
| 2010/0099478 | A1 * | 4/2010 | Alderucci et al. .............. 463/12 |
| 2010/0099479 | A1 | 4/2010 | Miller |
| 2010/0099481 | A1 * | 4/2010 | Alderucci et al. .............. 463/13 |
| 2010/0105457 | A1 | 4/2010 | Miller |
| 2010/0105458 | A1 | 4/2010 | Miller |
| 2010/0105459 | A1 | 4/2010 | Miller |
| 2010/0105461 | A1 | 4/2010 | Miller |
| 2010/0113119 | A1 | 5/2010 | Miller |
| 2010/0113126 | A1 | 5/2010 | Miller |
| 2010/0113137 | A1 | 5/2010 | Miller |
| 2010/0120483 | A1 | 5/2010 | Lutnick et al. |
| 2011/0180993 | A1 | 7/2011 | Amaitis et al. |
| 2012/0056374 | A1 | 3/2012 | Lutnick et al. |
| 2012/0058814 | A1 | 3/2012 | Lutnick et al. |

OTHER PUBLICATIONS

"Casino Verite Blackjack History", 8 pages; Accessed Oct. 13, 2008; http://web.archive.org/web/20010819115538/www.qfit.com/cvhist.htm.

Blackjack Table Image, 1 page; Accessed Oct. 13, 2008; http://web.archive.org/web/20010414005535/www.qfit.com/cvssb1.htm.

"Counting Cards", 1 page; Accessed Oct. 13, 2008; http://web.archive.org/web/20010715031334/www.casinosoftware.net/software/html/CC2Setup.zip.html.

"Deck of Cards.Java Programming Assignment"; 4 pages; Accessed Oct. 13, 2008 http://web.archive.org/web/20010418172543/www.cs.clemson.edu/~pargas/courses/cs241/current/assignments/spring2001/p1/DeckOfCards.html.

"Baccarat-Learn to play like a professional with a unique free evaluation—Features", 4 pages; Accessed Oct. 13, 2008 http://web.archive.org/web/20010603045041/www.happyfortune.com/features.htm.

U.S. Appl. No. 11/850,565, filed Sep. 5, 2007, Lutnick et al.

U.S. Appl. No. 11/669,996, filed Feb. 1, 2007, Lutnick et al.

U.S. Appl. No. 11/972,002, filed Jan. 10, 2008, Amaitis et al.

U.S. Appl. No. 12/169,383, filed Jul. 8, 2008, Lutnick et al.

U.S. Appl. No. 12/252,488, filed Oct. 16, 2008, Alderucci et al.

U.S. Appl. No. 12/253,343, filed Oct. 17, 2008, Alderucci et al.

U.S. Appl. No. 12/254,485, filed Oct. 20, 2008, Alderucci et al.

U.S. Appl. No. 12/255,123, filed Oct. 21, 2008, Miller.

U.S. Appl. No. 12/256,634, filed Oct. 23, 2008, Miller.

U.S. Appl. No. 12/256,640, filed Oct. 23, 2008, Miller.

U.S. Appl. No. 12/257,649, filed Oct. 24, 2008, Miller.

U.S. Appl. No. 12/259,330, filed Oct. 28, 2008, Miller.

U.S. Appl. No. 12/263,768, filed Nov. 3, 2008, Miller.

U.S. Appl. No. 12/263,779, filed Nov. 3, 2008, Miller.

U.S. Appl. No. 12/263,789, filed Nov. 3, 2008, Miller.

U.S. Appl. No. 12/688,422, filed Jan. 15, 2010, Lutnick et al.

Canadian Examiner's Report for Application No. 2,625,171 dated Oct. 7, 2009 (4 pages).

Notification of Transmittal of the International Search Report and Written Opinion for International Application No. PCT/US07/77646, dated Sep. 30, 2008 (11 pages).

International Preliminary Report on Patentability for International Application No. PCT/US07/77646, dated Mar. 10, 2009 (6 pages).

USPTO Office Action for U.S. Appl. No. 11/669,996; dated Feb. 17, 2009 (11 pages).

USPTO Examiner Interview Summary for U.S. Appl. No. 11/669,996; dated Jun. 17, 2009 (4 pages).

Olaf Vancura & Ken Fuchs, Knock-Out Blackjack, Sep. 1998, Huntington Press, 1st Edition, pp. 43-72.

Notification of Transmittal of the International Search Report and Written Opinion for International Application No. PCT/US08/52461, dated Jul. 8, 2008 (10 pages).

International Preliminary Report on Patentability for International Application No. PCT/US08/52461, dated Aug. 4, 2009 (6 pages).

Australian Examiner's Report for Australian Application No. 2008201369, dated Aug. 26, 2009 (2 pages).

Australian Examiner's Report for Australian Application No. 2007292385, dated May 28, 2010 (2 pages).

USPTO Examiner Interview Summary for U.S. Appl. No. 11/669,996; dated Nov. 23, 2009 (2 pages).

USPTO Notice of Allowance and Fees Due for U.S. Appl. No. 11/669,996; dated Nov. 23, 2009 (8 pages).

USPTO Office Action for U.S. Appl. No. 11/972,002, Mar. 19, 2010 (6 pages).

USPTO Supplemental Notice of Allowability for U.S. Appl. No. 11/669,996, Apr. 6, 2010 (4 pages).

USPTO Office Action for U.S. Appl. No. 11/972,002, Jun. 3, 2010 (8 pages).

(56) References Cited

OTHER PUBLICATIONS

USPTO Office Action for U.S. Appl. No. 12/688,422, dated Nov. 15, 2010 (7 pages).
USPTO Office Action for U.S. Appl. No. 11/972,002, dated Oct. 20, 2010 (6 pages).
USPTO Notice of Allowance and Fees Due and Examiner Interview Summary Record for U.S. Appl. No. 12/688,422, dated Aug. 12, 2011 (11 pages).
USPTO Office Action for U.S. Appl. No. 12/254,485, dated Oct. 7, 2011 (12 pages).
USPTO Office Action for U.S. Appl. No. 12/256,640, dated Sep. 19, 2011 (26 pages).
USPTO Office Action for U.S. Appl. No. 12/257,649, dated Jun. 24, 2011 (6 pages).
USPTO Office Action for Appl. No. 12/259,330, dated Oct. 4, 2011 (25 pages).
USPTO Office Action for U.S. Appl. No. 12/263,779, dated Jul. 22, 2011 (15 pages).
USPTO Office Action for U.S. Appl. No. 12/263,789, dated Sep. 20, 2011 (23 pages).
Canadian Examiner's Report for Application No. 2,662,856, dated Aug. 19, 2011 (3 pages).
USPTO Office Action for U.S. Appl. No. 12/253,343, dated Oct. 12, 2011 (11 pages).
U.S. Appl. No. 60/824,522, filed Sep. 5, 2006, Lutnick et al.
U.S. Appl. No. 60/824,648, filed Sep. 6, 2006, Lutnick et al.
USPTO Notice of Allowance and Fees Due for U.S. Appl. No. 11/972,002, dated Feb. 4, 2011 (7 pages).
USPTO Office Action for U.S. Appl. No. 12/169,383, dated Mar. 28, 2011 (11 pages).
Japanese Office Action with English Translation for Application No. 2009-518656, mailed Mar. 15, 2011 (6 pages).
USPTO Office Action for U.S. Appl. No. 12/252,488, dated Mar. 31, 2011 (7 pages).
USPTO Office Action for U.S. Appl. No. 12/255,123, dated Apr. 20, 2011 (6 pages).
USPTO Office Action for U.S. Appl. No. 12/256,634, dated Apr. 6, 2011 (8 pages).
USPTO Office Action for U.S. Appl. No. 12/263,768, dated Apr. 25, 2011 (6 pages).
Australian Examiner's Report for Australian Application No. 2007292385, dated May 26, 2011 (3 pages).
USPTO Office Action for U.S. Appl. No. 11/850,565, dated May 12, 2011 (7 pages).
USPTO Office Action for U.S. Appl. No. 12/252,488, dated Nov. 2, 2011 (4 pages).
USPTO Notice of Allowance and Fees Due for U.S. Appl. No. 12/256,634, dated Nov. 7, 2011 (5 pages).
USPTO Office Action for U.S. Appl. No. 11/850,565, dated Dec. 27, 2011 (14 pages).
USPTO Office Action for U.S. Appl. No. 13/081,787, dated Jan. 30, 2012 (6 pages).
USPTO Notice of Allowance and Fees Due for U.S. Appl. No. 12/263,768, dated Dec. 5, 2011 (5 pages).
Australian Examiner's Report for Australian Application No. 2007292385, dated Dec. 7, 2011 (3 pages).
USPTO Notice of Allowance and Fees Due for U.S. Appl. No. 12/255,123, dated Dec. 2, 2011 (5 pages).
USPTO Notice of Allowance and Fees Due for U.S. Appl. No. 12/252,488, dated Feb. 8, 2012 (5 pages).
Australian Notice of Acceptance for Application No. 2007292385, dated Feb. 29, 2012 (3 pages).
USPTO Notice of Allowance and Fees Due for U.S. Appl. No. 12/257,649, dated Mar. 27, 2012 (8 pages).
USPTO Office Action for U.S. Appl. No. 12/263,779, dated Mar. 20, 2012 (14 pages).
Japanese Office Action with English Translation for Application No. 2009-527543, mailed Mar. 21, 2012 (8 pages).
Japanese Office Action with English Translation for Application No. 2009-518656, mailed Apr. 24, 2012 (16 pages).
"Blackjack" (Japanese text), Wikipedia, Jan. 23, 2007 (retrieved on Apr. 9, 2012).
USPTO Office Action for U.S. Appl. No. 13/163,991, dated Jul. 10, 2012 (11 pages).
USPTO Office Action for U.S. Appl. No. 13/297,892, dated Jul. 19, 2012 (12 pages).
USPTO Office Action for U.S. Appl. No. 13/081,787, dated Jul. 25, 2012 (3 pages).
USPTO Office Action for U.S. Appl. No. 12/253,343, dated Aug. 21, 2012 (10 pages).
USPTO Office Action for U.S. Appl. No. 12/254,485, dated Aug. 21, 2012 (11 pages).
USPTO Notice of Allowance and Fees Due for U.S. Appl. No. 13/409,349; dated Jun. 8, 2012 (10 pages).
USPTO Office Action and Examiner Interview Summary Record for U.S. Appl. No. 12/256,640, dated Jul. 6, 2012 (27 pages).
USPTO Notice of Allowance and Fees Due and Examiner Interview Summary for U.S. Appl. No. 12/259,330; dated Jul. 9, 2012 (14 pages).
USPTO Notice of Allowance and Fees Due for U.S. Appl. No. 12/263,789; dated Jun. 13, 2012 (17 pages).
USPTO Office Action for U.S. Appl. No. 12/169,383, dated Oct. 9, 2012 (15 pages).
USPTO Office Action for U.S. Appl. No. 12/169,383, dated Oct. 19, 2012 (3 pages).
Australian Examiner's Report for Australian Application No. 2012202693, dated Jan. 14, 2013 (2 pages).
Canadian Examiner's Report for Application No. 2,662,856, dated Nov. 13, 2012 (5 pages).
USPTO Notice of Allowance and Fees Due for U.S. Appl. No. 12/263,779, dated Nov. 26, 2012 (15 pages).
USPTO Pre-Brief Appeal Conference Decision for U.S. Appl. No. 12/263,779, dated Jan. 3, 2013 (2 pages).
USPTO Office Action for U.S. Appl. No. 13/297,892, dated Mar. 22, 2013 (8 pages).
USPTO Office Action for U.S. Appl. No. 11/850,565, dated Apr. 26, 2013 (14 pages).
USPTO Notice of Allowance and Fees Due for U.S. Appl. No. 11/850,565, dated May 15, 2013 (20 pages).
Japanese Office Action with English Translation for Application No. 2009-518656, mailed Apr. 16, 2013 (11 pages).
USPTO Notice of Allowance and Fees due for U.S. Appl. No. 13/081,787, dated May 1, 2013 (21 pages).
USPTO Pre-Brief Appeal Conference Decision for U.S. Appl. No. 12/169,383, dated Apr. 24, 2013 (2 pages).
USPTO Pre-Brief Appeal Conference Decision for U.S. Appl. No. 12/253,343, dated Apr. 10, 2013 (10 pages).
USPTO Pre-Brief Appeal Conference Decision for U.S. Appl. No. 12/254,485, dated Apr. 10, 2013 (2 pages).
USPTO Office Action for U.S. Appl. No. 13/555,300, dated Jul. 5, 2013, 10 pages.
Canadian Examiner's Report for Application No. 2,625,171, dated Aug. 13, 2013 (5 pages).
USPTO Notice of Allowance and Fees due for U.S. Appl. No. 13/297,892, Oct. 8, 2013 (11 pages).
USPTO Office Action for U.S. Appl. No. 13/616,156, dated Oct. 10, 2013 (9 pages).
USPTO Notice of Allowance and Fees Due for U.S. Appl. No. 13/437,441, dated Oct. 21, 2013 (7 pages).

* cited by examiner

PAPER SLOTS 7'S
4 DECK VERSION
CLASS III

DETERMINATION OF RESTORATION EVENT

DESCRIPTION

Figure 1:
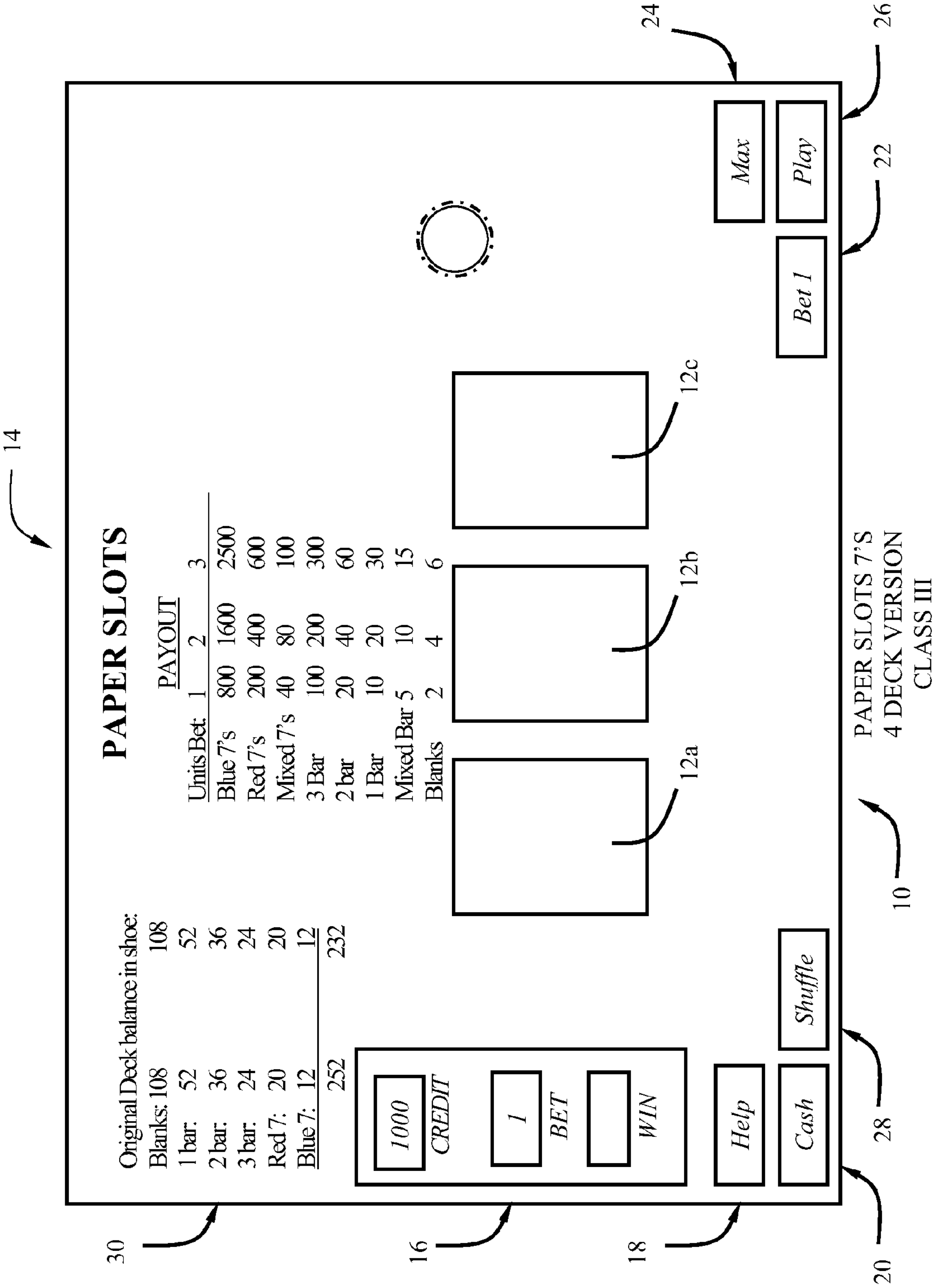
FIG. 1 shows a layout for a screen display for the electronic version before play.

U.S. patent application Ser. No. 09/977,138 entitled "Electronic Card Game and Method," filed Oct. 12, 2001, U.S. Provisional Application Ser. No. 60/241,644 entitled "Electronic Video Poker Game and Method," filed Oct. 19, 2000, U.S. patent application Ser. No. 09/942,520 entitled "Live And Electronic Wagering And Lottery Game," filed Aug. 29, 2001, U.S. Provisional Application Ser. No. 60/229,665 entitled "Live and Electronic Wagering and Lottery Game," filed Aug. 31, 2000, and U.S. patent application Ser. No. 11/007,108, entitled "Method of conducting a wagering game with continuous depletion," filed Dec. 7, 2004 are all hereby incorporated herein by reference.

Some embodiments of the present invention relate to a live and/or electronic wagering and/or lottery game. In some embodiments an inventory of game symbols are arranged in a random order and distributed to define an outcome for the game.

Wagering or casino or lottery games are typically referred to as live games or electronic games. Live games may include those such as Poker, Blackjack, Roulette and the like. Electronic games may include games such as Video Poker and electro-mechanical and video based slot machines. For electronic games, a player inputs a wager which can be money, tokens or fictitious credits. Operation of the device produces an outcome, which can be a winning or a losing outcome.

For Video Poker, virtual cards are dealt and the player, by holding and discarding cards, attempts to construct a winning hand combination. For each hand of play, the cards may be randomly selected from what may be deemed to be a full deck of cards (e.g., by a random number generator). That is, as hands are sequentially played, the virtual deck may not be depleted of the cards that have already been played. After each hand, the game may proceed as though it were being dealt from a freshly shuffled deck.

For slot machines, symbols may be randomly selected and presented along one or more pay lines. The combinations of symbols at an enabled pay line determines whether the player has obtained a winning or a losing outcome.

For live games such as Blackjack, cards may be dealt from a deck or from a shoe containing multiple decks to players. The players assemble a final hand of cards which is the outcome. In Blackjack the final hand is the sum of the values of the cards according to the well known rules of the game. As hands are dealt the deck or shoe is depleted to a point where the cards are reshuffled. Players can keep track of the cards played and thus know which cards remain in the deck or shoe. This may give them an advantage.

It should be recognized that any game may be implemented as a live and/or electronic game. It various embodiments, any game may be played according to various methods and using various apparatus.

Some embodiments may include a game which has the excitement of a slot machine as well as the anticipation accompanying the deal of cards. Some embodiments may include a game where the inventory of symbols is depleted as hands are played, like a deck of cards, until the inventory needs to be re-shuffled. Some embodiments may include an electronic game which permits the player to, after any hand, order re-shuffling of the symbol inventory. Some embodiments may include an electronic game where the remaining inventory of symbols for play can be displayed for the player to see.

Some embodiments of the present invention may include a method and device for a game which randomly arranges game symbols into a serial ordered inventory and displays the same in sequence to define one or more outcomes. In some embodiments, a display displays the constituency of the inventory as symbols are depleted from the inventory during play. In some embodiments, at a prompt by the player or at substantially a predetermined point of exhaustion of the inventory, the inventory is re-constituted and re-shuffled into a random serial order.

In some embodiments, a method includes configuring the game inventory indicia into a random, serial order. In some embodiments, a player makes wagers and plays each of a series of hands. In some embodiments, for each hand of play a predetermined number of game indicia are revealed to define an outcome, said indicia selected in order from the serially arranged inventory. In some embodiments, a method may further include displaying the constituency of the inventory depleted of said revealed indicia for each hand as well as issuing an award to a player obtaining one of a plurality of preselected winning indicia combinations.

In some embodiments, a device for playing a game may include a processor, said processor configured to include means for randomly arranging an inventory of game symbols or indicia into a serial order and a video display. In some embodiments, means may be provided for a player to make a wager and prompt play of the game. In some embodiments, the processor, in response to prompting of play, may be configured to select and display at said display a predetermined number of indicia selected in order from said arranged inventory to define an outcome. In some embodiments, the processor may be configured to compare said outcome to a schedule of winning outcomes stored in a data structure and to issue an award for a winning combination. In some embodiments, the processor may be configured to display the constituency of the remaining symbol inventory.

Turning to FIG. 1, a layout 10 for the game according to the present invention is shown for play as displayed for the electronic version of a game according to some embodiments. According to this embodiment, the display includes three areas, 12_a_ through 12_c_, which, as described below, receive game cards as dealt to produce an outcome for the game. The display may also show a pay schedule 14 as well as a credit meter 16 which reflects the number of credits are available for wagering, the amount wagered on a hand of play and the amount won. There also may be provided various buttons embodied as buttons on the machine or as areas on the display touch screen. These buttons include a help button 18 for the player to receive assistance concerning play, a cash out button 20 to cash out accumulated credits, a bet one credit button 22, max bet button 24 and play button 26. Also provided according to some embodiments of the present invention may be a shuffle button 28 the purposes of which will hereinafter become evident.

In some embodiments, to play a device, the player makes a wager by inserting coins or tokens or by depressing the bet one credit button 22 or max bet button 24. The placing of a maximum bet will automatically prompt play of the hand, otherwise the player may depress the play button 26 to start play. Upon the start of play, the processor for the machine, from stored data representing an ordered deck or inventory of game cards, selects and displays three cards in areas 12*a* through 12*c*. In some embodiments, the game includes cards. Certain game cards are as illustrated in FIGS. 3A through 3D. In some embodiments, a virtual deck includes sixty three game cards according to the following distribution:

TABLE US-00001

| Distribution of Game Cards | |
|---|---|
| Symbol | Number in deck |
| "BAR" | 15 |
| "BAR-BAR" | 9 |
| "BAR-BAR-BAR" | 7 |
| Red "7" | 5 |
| Blue "7" | 3 |
| Blank | 24 |
| Total | 63 |

The three cards as selected and displayed represent the outcome for the game. The player wins a payback based preferably based upon the following pay schedule in some embodiments.

TABLE US-00002

| Pay Schedule | | | |
|---|---|---|---|
| | Units Bet | | |
| | 1 | 2 | 3 |
| 3 Blue 7s | 2000 | 4000 | 6000 |
| 3 Red 7s | 300 | 600 | 900 |
| Mixed 7s | 50 | 100 | 150 |
| 3 BAR-BAR-BAR | 50 | 100 | 150 |
| 3 BAR-BAR | 20 | 40 | 60 |
| 3 BAR | 10 | 20 | 30 |
| Mixed BARs | 5 | 10 | 15 |
| 3 Blanks | 1 | 2 | 3 |

Other pay schedules, symbols and distributions of symbols can be adopted.

Figure 2:
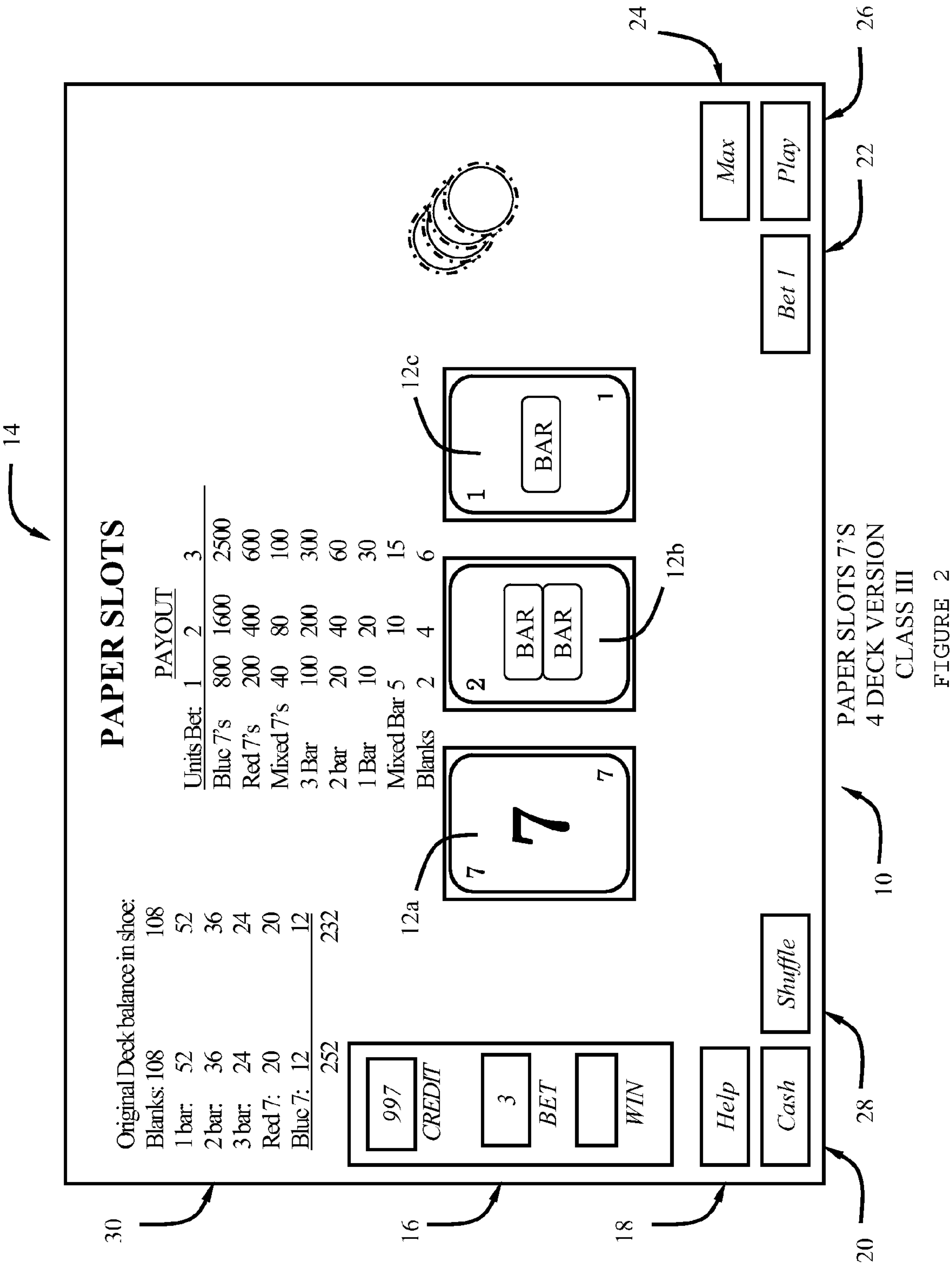
FIG. 2 shows a layout for the screen display for the electronic version after the deal of cards.
Figure 3A:
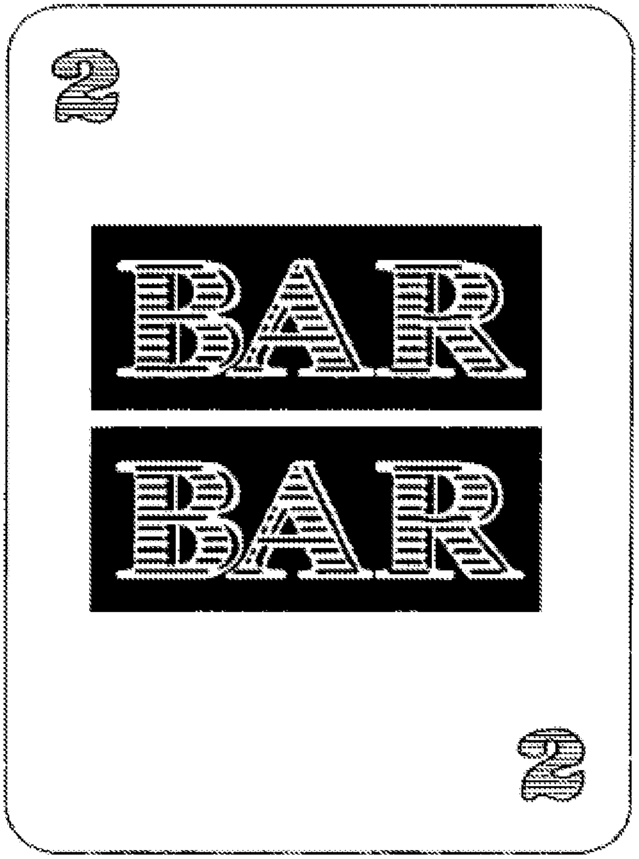
FIGS. 3A through 3D show representations of symbols which may be used for play of the game.
Figure 3B:
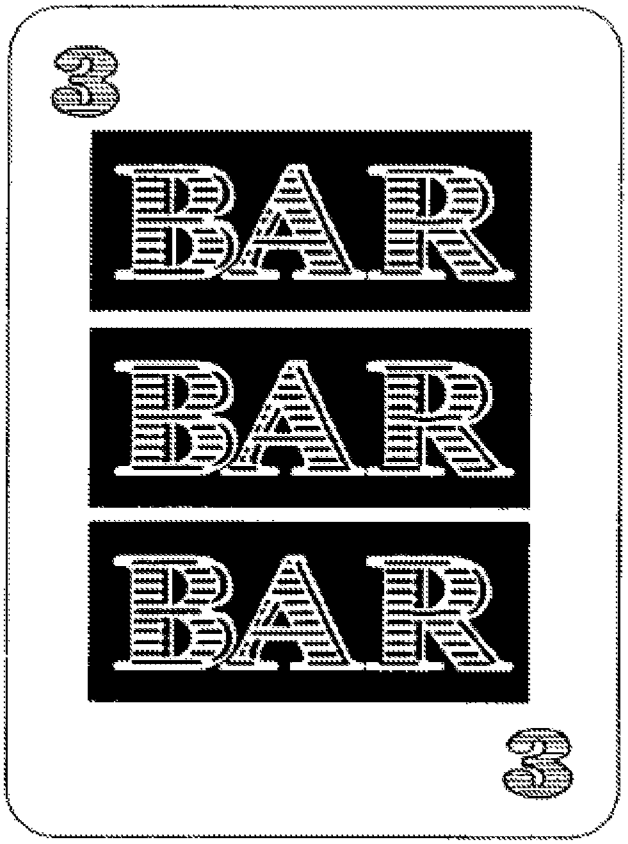
Figure 3C:
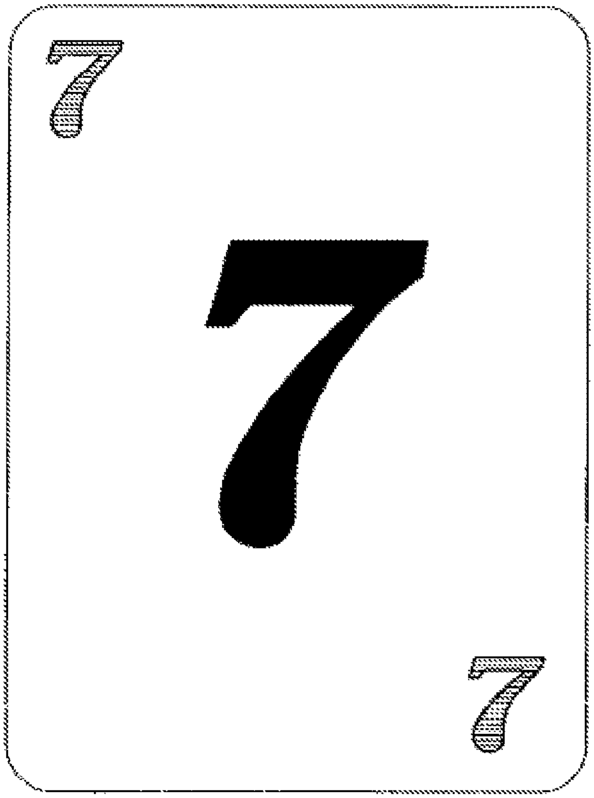
Figure 3D:
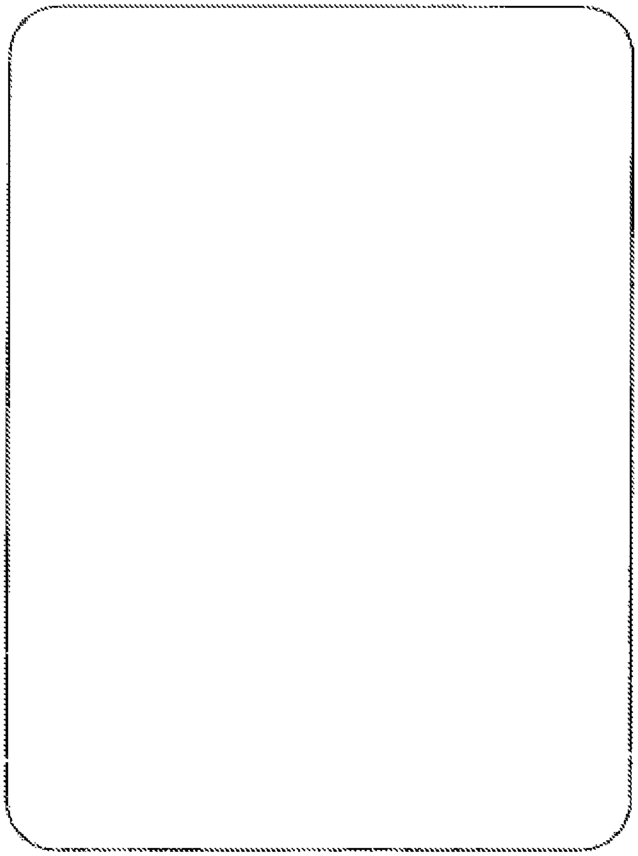

As shown in FIG. 2, the player has not obtained a winning combination since the combination is "7", "BAR-BAR" and "BAR". Thus the player would lose their wager.

In some embodiments, to play the next hand, the player inputs another wager and prompts play whereupon the processor would select and display the next three symbols in the ordered data structure representing the deck of game cards.

Some embodiments may include a data structure of game cards that may be stored in serial order as determined by a virtual shuffle of game cards. For example, the processor for the game may randomly arrange the cards in a serial order 1 through X, where, for the game described herein, X equals 63. In some embodiments, as hands are played one after another, the game cards are selected and displayed in the serial order in which they are positioned in the deck. For example, for the first hand cards in positions 1 through 3 would be displayed and removed from the arranged deck. For example, for the next hand the cards would be selected from positions 4 through 6 and so forth until the deck is depleted or reaches a predetermined location in the arrangement proximate the last sequential card. In some such embodiments, the serial play of hands thus depletes the virtual deck of cards in serial order as cards are selected. In some embodiments, when the deck is depleted to, for example, three remaining game cards, the processor reshuffles the deck and places the cards in a new, random serial order. By random serial order in this embodiments, what is meant is that, like an actual deck, the cards would be randomized and placed in sequence, 1 through X. In other embodiments, such random serialization, reshuffling, reordering, and/or finite decks may not be used and/or any other methods and/or elements may be used.

A feature of some embodiments of the present invention is that prior to entering a wager, the player can depress the help button 18 which controls the game processor to display a deck balance area 30 the constituency of the cards remaining in the deck. For example, if forty cards have been dealt for preceding hands, the balance area would display, for the remaining twenty-three cards, how many Blanks, BARs, BAR-BARs, and 7s remain in the deck. If, for example, all of the Blue 7s have been played thus depriving the player of the ability to have a 3 Blue 7s outcome, the player can depress the shuffle button 28 and the processor will reshuffle and randomize the deck. The ability to see the balance of the deck remaining for play may lead the player to increase their wagers based upon the perception that the probabilities for obtaining a favorable outcome are increased. Further, the ability to reshuffle in some embodiments may also convince the player that the game is fair.

In some embodiments, a game can be played with a single virtual deck or multiple virtual decks. Further the game may be played as a video lottery where it is guaranteed that in any particular cycle of hands, that each series of prizes will be awarded. For example, if the cycle is selected as 238,266 hands, the pay outs and frequencies are as set forth below:

TABLE US-00003

| 238,266 Hands in Cycle | | | |
|---|---|---|---|
| Symbols | Hits | Payout | Max Bet Total Payout |
| Blue 7s | 6 | 6000 | 36,000 |
| Red 7s | 60 | 900 | 54,000 |
| Mixed 7s | 270 | 150 | 40,500 |
| BAR-BAR-BAR | 210 | 150 | 31,500 |
| BAR-BAR | 504 | 60 | 30,240 |
| BAR | 2730 | 30 | 81,900 |
| Mixed BARs | 23,536 | 15 | 352,890 |
| Blanks | 12,144 | 3 | 36,432 |
| | 39,450 | | 663,462 |

Total Play: 714,748
Total Payout: −663,462
Total Hold 51,336 (7.18%)
Hit Ratio: 1 in 6.04 hands Thus, it is seen that for some embodiments of a lottery based game, the game presents a 7.18% hold. This hold can be increased or decreased by altering the pays for one or more winning combinations or by adding more, or deleting, winning combinations.

In some embodiments, for a table game version, a table is provided much like a Blackjack table having, for example, six player positions. At each player position there may be provided the areas 12*a* through 12*c* for the players game cards. Each player may make a wager, the minimums and maximums of which may be dictated by house rules. After each player has made their desired wager, a dealer from a single deck of shuffled game cards or a shoe containing multiple, e.g. four, shuffled decks, may deal three game cards to each of the player's areas 12*a* through 12*c*. Depending upon the combination of cards, as discussed above, the player wins or loses. After paying each winning player and collecting losing wagers, the players make new wagers and new hands are dealt.

In some embodiments, before the start of dealing from a newly shuffled deck the dealer may discard, i.e. burn, three cards. Alternatively, the dealer may deal until there are three cards left in the deck, and then reshuffle. In some embodiments, dealing from the deck or shoe continues until reshuffling is warranted by there being insufficient cards left in the deck to deal hands of three cards to each player.

In some embodiments of an electronic version of the game, the players have the benefit of having displayed the deck balance and ordering reshuffling.

Figure 4:
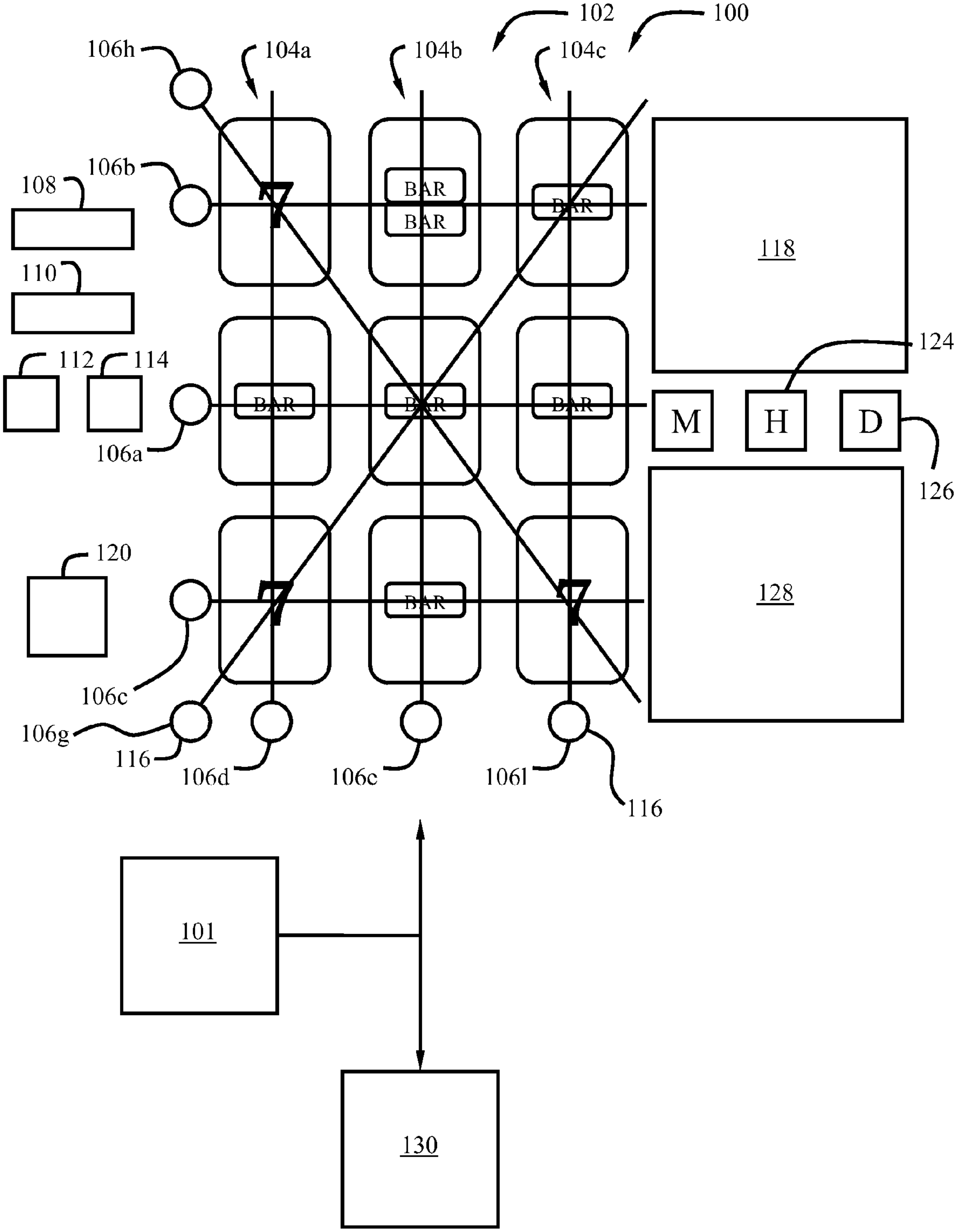
FIG. 4 shows a display for another version of the electronic game.

FIG. 4 illustrates a further example version of an electronic game. In FIG. 4 there is shown and electronic game display 100 controlled by a computer processor 101 to define a three-by-three matrix 102 in the form of a three reel slot machine. Thus the matrix 102 shows three reels 104*a* through 104*c* each having three rows for the display of selected game symbols. The matrix 102 also defines a plurality of pay lines 106*a* through 106*h*, shown as eight which embrace the horizontal rows, the vertical columns formed by the reels 104*a* through 104*c*, and the diagonals. As hereinafter described, game indicia are displayed in the matrix 102 to define outcome for each pay line 106*a* through 106*h*.

In this example embodiment, the processor also controls the display 100 to display other features for the game. At 108 the display 100 shows the total win for the game or spin whereas at 110 the total amount of credits for gaming are displayed. The total wagered for the last game played is displayed at 112. For a current game, before the spin, the total game wager is displayed at 114.

In this example embodiment, in regards to game wagers, each pay line 106*a* through 106*h* includes a banner 116 to indicate the amount being wagered on each corresponding pay line 106*a* through 106*h*. For example, if the player wagers three per pay line, each banner 116 would show "3" and the total game wager would be displayed at 114 as "24" (3.times.8 pay lines).

The display 100 also, in this example embodiment of the present invention, displays at 118 the inventory of symbols remaining for play. For example, where there are 63 symbols, after the initial shuffle the inventory of display may display the following:

TABLE US-00004

| Symbols | Remaining |
|---|---|
| Blue 7s | 3 |
| Red 7s | 5 |
| BAR-BAR-BAR | 7 |
| BAR-BAR | 9 |
| BAR | 15 |
| Blanks | 24 |
| Total | 63 |

In some embodiments, as hands or games are played, the inventory display 118 would be depleted based upon the depletion of the symbols from the serial inventory. For example, and with reference to FIG. 4, the inventory may be now shown to be the following (all 7s in FIG. 4 assumed to be Red 7s):

TABLE US-00005

| Symbols | Remaining |
|---|---|
| Blue 7s | 3 |
| Red 7s | 2 |
| BAR-BAR-BAR | 7 |
| BAR-BAR | 8 |
| BAR | 10 |
| Blanks | 24 |

In some embodiments, as games are played the player can assess the constituency of the remaining inventory. This feature may alter the wagering decisions of the player, e.g. to increase or decrease the wagers. It should be recognized that some embodiments may not include serial inventories, such depletion of symbols, and/or any other elements.

In some embodiments, in the event the player is dissatisfied with the remaining constituency of the inventory, the player can order the inventory to be re-shuffled by, for example, touching a touch screen button 120. In some embodiments, for re-shuffling the inventory is returned to its full symbol inventory, e.g. 63 symbols, and the symbols are randomly shuffled and placed in serial order. In some embodiments, the inventory display 118 may show a reconstituted, full, inventory. It should be recognized that some embodiments may not include such reshuffling, such touch screen buttons, and/or any other elements.

In some embodiments, the display 100, which again may be a touch screen display, includes other features. At 122 a button is presented, the touching of which applies a maximum wager to the game, e.g. 24 units. The wager, as with all wagers, may deplete the credit inventory displayed at 110. A help button 124 controls the game processor to display game information to the player. Finally, at 126 there is a deal button 126 which prompts play of a hand.

In some embodiments, at 128 the display 100 shows a pay table for winning pay line combinations. The winning combinations would be preselected and stored in a data structure for the processor 101.

TABLE US-00006

| Pay Table | | | |
|---|---|---|---|
| | Wager | | |
| | 1 | 2 | 3 |
| Blue 7s | 3000 | 6000 | 9000 |
| Red 7s | 300 | 600 | 900 |
| Any 7s | 50 | 100 | 150 |
| BAR-BAR-BAR | 50 | 100 | 150 |
| BAR-BAR | 20 | 40 | 60 |
| BAR | 10 | 20 | 30 |
| Any Bar | 5 | 10 | 15 |
| Blanks | 1 | 2 | 3 |

In some embodiments, to play the example game of FIG. 4, the player wagers on one or more pay lines 106*a* through 106*h*. For purposes of this description it shall be assumed that the player has depressed the maximum wager button 122 to wager 3 units on each pay line 106*a* through 106*h*. The processor is prompted to select nine symbols from the beginning of the serial, random inventory and displays the same in the rows and columns of the game matrix 102 as shown. Based upon the symbols selected and displayed the player has obtained certain winning outcomes as tabulated below (all 7s are Red 7s):

TABLE US-00007

| Pay line | Award |
|---|---|
| 106a | 30 (Three "BARs") |
| 106e | 15 (Three Any "BARs") |
| Total win | 45 |

In some embodiments, the award is displayed at 108 and may be issued at 130 in the form of credits, tokens, printed ticket or as otherwise known in the art.

In some embodiments, the inventory display 118 may show the displayed symbols removed from the inventory as tabulated above. In some embodiments, the player would enter wagers to play the next game. In some embodiments, based upon the displayed inventory, the player may choose before any play to re-shuffle and re-constitute the inventory by touching the re-shuffle button 120. In some embodiments, for example, if all of the Red and Blues 7s have been depleted from the inventory, the player would re-shuffle so that the higher award pay outs would be possible.

According to a further embodiment, the game may include "Wild" symbols which are wild to complete any winning outcome. Further the game symbols may be representations of playing cards. In some embodiments, a displayed, fully constituted inventory would be, for example, as follows:

TABLE US-00008

| Symbol | Number |
|---|---|
| Wild | 4 |
| Kings | 5 |
| Queens | 6 |
| Jacks | 8 |
| 10s | 10 |
| Blanks | 30 |
| Total | 63 |

Further the pay table for the example game may be as follows:

TABLE US-00009

| Pay Table | | | |
|---|---|---|---|
| | Wager | | |
| | 1 | 2 | 3 |
| Wilds | 800 | 1500 | 2500 |
| Kings | 100 | 200 | 300 |
| Queens | 50 | 100 | 150 |
| Jacks | 20 | 40 | 60 |
| 10s | 10 | 20 | 30 |
| Blanks | 1 | 2 | 3 |

Thus the game may use any suitable symbols if desired. Further the game matrix 102 may be expanded to four, five or more reels and may include more or less pay lines.

In some embodiments, the game can also be played as a live game where the indicia are put on cards which are dealt to each player from the deck including the card distribution as set forth above. In some embodiments, each player makes a wager and is dealt three cards from the deck which define the outcome. In some embodiments, at a predetermined point of penetration into the deck, e.g. 5 rounds of play, the deck is reconstituted and re-shuffled. In some embodiments, the player based upon the known distribution of symbols, may also be permitted to order reconstituting and re-shuffling of the deck for the next hand.

In some embodiments, an exclusion/depletion of dealt game indicia/cards such that at least one value of the game indicia/cards is eliminated may result in a restoration of game indicia/cards. For example, in some implementations, if an exclusion of a card from a deck results in no cards having the same value being available for a next hand, a restoration event may occur (e.g., card data may be restored, a deck may be reshuffled, etc.). In some implementations, the number of card values not being available for a next hand may be greater than one. For example, if dealing a hand results in no further 10's and no further 2's, a restoration of the cards may occur.

Some implementations may include determining if such an exclusion results from a depletion of deck data/inventory/a finite set. Such determination may include, for example, referencing a table of available outcomes and/or determining in any other way.

In some implementations, a plurality of values that are eliminated that lead to a restoration event may include all the cards dealt in a game hand. For example, for a game hand in which a 10, a 2, a 4, and a 6 are the only cards dealt, a restoration event may occur if after the dealing, there are no 10s, no 2s, no 4s, and no 6s remaining in the deck. In some implementations, this may be a rare occurrence.

While certain embodiments of the present invention have been described, it should be understood that it is subject to many modifications and changes without departing from the spirit and scope of the appended claims.

What is claimed is:

1. A method for conducting a wagering game using an inventory of indicia, said inventory when fully constituted having X number of indicia arranged in sets of at least two indicia each, the method comprising: receiving, by a computing device, a wager from a player to play each of a series of hands; for each hand of play, randomly selecting and displaying, by the computing device, a plurality of individual indicia from the inventory, the combination of indicia selected and displayed defining at least one hand outcome and depleting said selected indicia from play for subsequent hands; comparing, by the computing device, said hand outcome to a predetermined schedule of winning outcomes and if said hand outcome matches one of said schedule of winning outcomes, issuing an award to the player; prior to play of the next hand displaying, by the computing device, the number of each indicia remaining in each indicia set in the inventory as depleted enabling a player to deduce any scheduled winning outcomes eliminated as a result of depletion of said indicia inventory; and in response to a determination that depleting dealt game indicia causes at least one value of the game indicia to be eliminated, restoring, by the computing device, depleted game indicia to said inventory.

2. The method of claim 1, in which the at least one value includes a plurality of values.

3. The method of claim 2, in which the plurality of values includes all values used in a game hand.

4. An electronic device for conducting a game for a player, said game utilizing an inventory of X number of game indicia arranged in sets of at least two indicia each when said inventory is fully constituted, the device comprising: a computer processor storing data corresponding to said inventory; a video display; means for a player to make a wager and prompt play of the game; said processor, in response to said prompt, configured to randomly select and display at said display a combination of individual indicia selected from said inventory of indicia, said selected and displayed indicia combination defining at least one outcome, said processor configured to remove said selected indicia from selection for future hands; said processor configured to compare each outcome to a predetermined schedule of winning outcomes stored in a data structure, to issue an award for each selected and displayed winning outcome, to control the display to display prior to the play of the next hand data corresponding the remaining inventory of indicia sets depleted of said displayed game indicia including the display of data corresponding to the depletion of indicia from said inventory such that a player is enabled to deduce when one or more scheduled winning outcomes are unavailable due to depletion and said processor configured to, for the next hand of play, select indicia from the depleted inventory; and said processor configured to restore depleted game indicia to said inventory in response to a determination that depleting dealt game indicia causes at least one value of the game indicia to be eliminated.

5. The device of claim 4, in which the at least one value includes a plurality of values.

6. The device of claim 5, in which the plurality of values includes all values used in a game hand.

7. A method for conducting a wagering game using an inventory of indicia, said inventory when fully constituted having X number of individual indicia, the method comprising: receiving, by a computing device, a wager from a player to play each of a series of hands; for each hand of play, randomly selecting and displaying, by the computing device, a plurality of individual indicia from the inventory, the combination of individual indicia selected and displayed defining a winning or losing outcome for the hand and depleting said displayed individual indicia from the inventory available for play of the next hand; for a winning outcome, issuing an award to the player; prior to the commencement of the next hand of play displaying, by the computing device, to the player information regarding the inventory of depleted indicia such that the player is enabled to deduce any winning outcomes eliminated by said depletion of indicia; receiving, by the computing device from the player, another wager to play a hand using the depleted inventory; and in response to a determination that depleting dealt game indicia causes at least one value of the game indicia to be eliminated, restoring, by the computing device, depleted game indicia to said inventory.

8. The method of claim 7, in which the at least one value includes a plurality of values.

9. The method of claim 8, in which the plurality of values includes all values used in a game hand.

10. A method for conducting a wagering game using an inventory of indicia, said inventory when fully constituted having X number of indicia arranged in indicia sets of at least two indicia each, the method comprising: receiving, by a computing device, a wager from a player to play the game; arranging, by the computing device, the inventory into a random serial order 1 through X; serially selecting and displaying, by the computing device, a plurality of individual indicia from the inventory, the combination of selected and displayed individual indicia defining a winning or losing outcome and depleting said displayed indicia from the inventory available for play of subsequent hands; for a winning outcome, issuing an award to the player; prior to play of the next hand displaying to the player, by the computing device, the number of each indicia remaining in each indicia set in the inventory as depleted of the prior selected and displayed inventory such that the player is enabled to deduce any winning outcomes eliminated by depletion of the indicia; receiving from the player, by the computing device, at least one of (i) another wager to play the game using the depleted inventory and (ii) a command to reconsititute the inventory to X number of indicia prior to the play of the next game; and in response to a determination that depleting dealt game indicia causes at least one value of the game indicia to be eliminated, restoring depleted game indicia to said inventory.

11. The method of claim 10, in which the at least one value includes a plurality of values.

12. The method of claim 11, in which the plurality of values includes all values used in a game hand.

13. A method for conducting a wagering game using an inventory of indicia sets, said inventory when fully constituted having X number of indicia, the method comprising: receiving, by a computing device, a wager from a player to play the game; for each hand of play, randomly selecting and displaying, by the computing device, a plurality of indicia from the inventory into the coordinates of a game matrix, the combinations of indicia in the game matrix defining a plurality of winning or losing outcomes and depleting said displayed indicia from the inventory available for play of subsequent hands; for each winning outcome, issuing an award to the player; prior to play of a subsequent hand, displaying, by the computing device, the number of each indicia remaining in the sets in the inventory as depleted of the prior selected and displayed inventory such that the player is enabled to deduce any winning outcomes eliminated as a result of depletion; receiving, by the computing device, an indication of the player opting to at least one of (i) make another wager to play a next game using the depleted inventory and (ii) commanding reconstitution of the inventory to X number of indicia prior to the play of the next game; and in response to a determination that depleting dealt game indicia causes at least one value of the game indicia to be eliminated, restoring, by the computing device, depleted game indicia to said inventory.

14. The method of claim 13, in which the at least one value includes a plurality of values.

15. The method of claim 14, in which the plurality of values includes all values used in a game hand.

16. An electronic device for conducting a game for a player, said game utilizing an inventory of X number of game indicia when said inventory is fully constituted, the device comprising: a computer processor storing an arrangement of said inventory; a video display; means for a player to make a wager and prompt play of the game; said processor, in response to prompting, configured to randomly select and display at said display indicia selected from said inventory of indicia, a hand comprised of a plurality of selected and displayed indicia defining an outcome and to preclude said selected indicia from selection from said inventory; said processor configured to compare said outcome to a schedule of winning outcomes stored in a data structure, to issue an award for a winning combination and to control the display to display prior to play of a next hand information regarding the inventory of depleted indicia such that a player is enabled to deduce any scheduled winning outcomes eliminated by depletion of said indicia; and means to prompt the processor to reconstitute said indicia inventory to X number of game indicia; and said processor configured to restore depleted game indicia to said inventory in response to a determination that depleting dealt game indicia causes at least one value of the game indicia to be eliminated.

17. The device of claim 16, in which the at least one value includes a plurality of values.

18. The device of claim 17, in which the plurality of values includes all values used in a game hand.

* * * * *